(12) United States Patent
Vadla et al.

(10) Patent No.: US 11,755,219 B1
(45) Date of Patent: Sep. 12, 2023

(54) BLOCK ACCESS PREDICTION FOR HYBRID CLOUD STORAGE

(71) Applicant: INTERNATIONAL BUSINESS MACHINES CORPORATION, Armonk, NY (US)

(72) Inventors: Ramakrishna Vadla, Patacheru (IN); Ranjith Rajagopalan Nair, Bangalore (IN); Amey Gokhale, Pune (IN); Archana Chinnaiah, Coimbatore (IN); Shubham Darokar, Amravati (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/825,829

(22) Filed: May 26, 2022

(51) Int. Cl.
    *G06F 3/06* (2006.01)

(52) U.S. Cl.
    CPC ............ *G06F 3/064* (2013.01); *G06F 3/067* (2013.01); *G06F 3/0622* (2013.01)

(58) Field of Classification Search
    None
    See application file for complete search history.

(56) References Cited

U.S. PATENT DOCUMENTS

| | | | |
|---|---|---|---|
| 2010/0241654 A1 | 9/2010 | Wu | |
| 2015/0106578 A1* | 4/2015 | Warfield | G06F 3/0653 |
| | | | 711/158 |
| 2016/0381176 A1* | 12/2016 | Cherubini | G06N 7/01 |
| | | | 709/219 |
| 2019/0073307 A1 | 3/2019 | Audenaert | |
| 2019/0109926 A1* | 4/2019 | Hotchkies | H04L 67/01 |
| 2019/0114275 A1* | 4/2019 | Dropps | G06F 12/0813 |
| 2019/0129834 A1* | 5/2019 | Purkayastha | G06N 20/00 |
| 2020/0125493 A1* | 4/2020 | Bent | G06F 12/0862 |
| 2021/0319306 A1* | 10/2021 | Leite Pinheiro de Paiva | |
| | | | G06F 18/2155 |

FOREIGN PATENT DOCUMENTS

| | | |
|---|---|---|
| CN | 111158613 B | 7/2020 |
| CN | 111767114 A | 10/2020 |

OTHER PUBLICATIONS

Dai et al., "Provenance-Based Object Storage Prediction Scheme for Scientific Big Data Applications," ResearchGate, Oct. 2014, 11 pgs., <https://www.researchgate.net/publication/281295499>.

(Continued)

*Primary Examiner* — Edward J Dudek, Jr.
*Assistant Examiner* — Ralph A Verderamo, III
(74) *Attorney, Agent, or Firm* — Caleb D. Wilkes

(57) ABSTRACT

A method, computer system, and a computer program product for block prediction are provided. A computer receives a first retrieval request for retrieving data from storage blocks. The computer performs a cosine similarity comparison of the first retrieval request compared to prior data retrievals. The computer selects a matching data retrieval of the prior data retrievals. The matching data retrieval has a closest match to the first retrieval request based on the cosine similarity comparison. The computer identifies another storage block from the matching data retrieval as a predicted block for the first retrieval request. The computer transmits a prefetch request to prefetch data from the predicted block.

20 Claims, 5 Drawing Sheets

(56) References Cited

OTHER PUBLICATIONS

Fielding et al., "Header Field Definitions, Part of Hypertext Transfer Protocol—HTTP/1.1," RFC, 2616, [accessed Mar. 17, 2022], 36 pgs., Retrieved from the Internet <http://www.w3.org/Protocols/rfc2616/rfc2616-sec14.html#sec14.35>.

Ma et al., "KBP: Mining Block Access Pattern for I/O Prediction with K-Truss," 2021 IEEE Intl Conf on Parallel & Distributed Processing with Applications, Big Data & Cloud Computing, Sustainable Computing & Communications, Social Computing & Networking (ISPA/BDCloud/SocialCom/SustainCom), 2021, pp. 167-176, <http://www.cloud-conf.net/ispa2021/proc/pdfs/ISPA-BDCloud-SocialCom-SustainCom2021-3mkuIWCJVSdKJpBYM7KEKW/264600a167/264600a167.pdf>.

Mell et al., "The NIST Definition of Cloud Computing", National Institute of Standards and Technology, Special Publication 800-145, Sep. 2011, pp. 1-7.

\* cited by examiner

BLOCK ACCESS PREDICTION FOR HYBRID CLOUD STORAGE

BACKGROUND

The present invention relates generally to retrieving data from long-term storage, to hybrid cloud storage systems for which application workloads are running, and to improving access speed for accessing data from data storage blocks.

SUMMARY

According to one exemplary embodiment, a method for block prediction is provided. A computer receives a first retrieval request for retrieving data from storage blocks. The computer performs a cosine similarity comparison of the first retrieval request compared to prior data retrievals. The computer selects a matching data retrieval of the prior data retrievals. The matching data retrieval has a closest match to the first retrieval request based on the cosine similarity comparison. The computer identifies another storage block from the matching data retrieval as a predicted block for the first retrieval request. The computer transmits a prefetch request to prefetch data from the predicted block. A computer system and a computer program product corresponding to the above-described method are also provided.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, a computer system, and a computer program product for reducing the time required to retrieve data from long-term storage. Data may be stored at locations that differ from a location in which a computing workload is performed such as elsewhere in a cloud environment. Retrieving the data from the other locations to the computing location may add significant processing time and may result in bottlenecks. The present embodiments help predict which data blocks will be accessed for a computing workload and may prefetch the data based on those predictions. Application workload performance may naturally fetch data from various blocks on a staggered and/or delayed basis as requests may be received by the application workload in a piece-meal manner. Fetching the particular blocks in advance, also known as prefetching, helps reduce the processing time for the application workload, because then the relevant data block may be accessed from local data storage instead of from in the cloud. The reduction in data retrieval time is useful in modern day cloud usage in which much data is stored on the cloud. Downloading data can result in bottlenecks which hold up computing and/or decision-making while the program or user waits for data to be downloaded from the cloud. Reducing the time required for data retrieval from the cloud may thus improve various computing programs, computing processes, and computing workloads. The present embodiments may be applied to improve, for example, object-based storage, hybrid cloud storage systems, read range requesting from object based storage, and recommendation systems and corresponding filtering.

Figure 1:
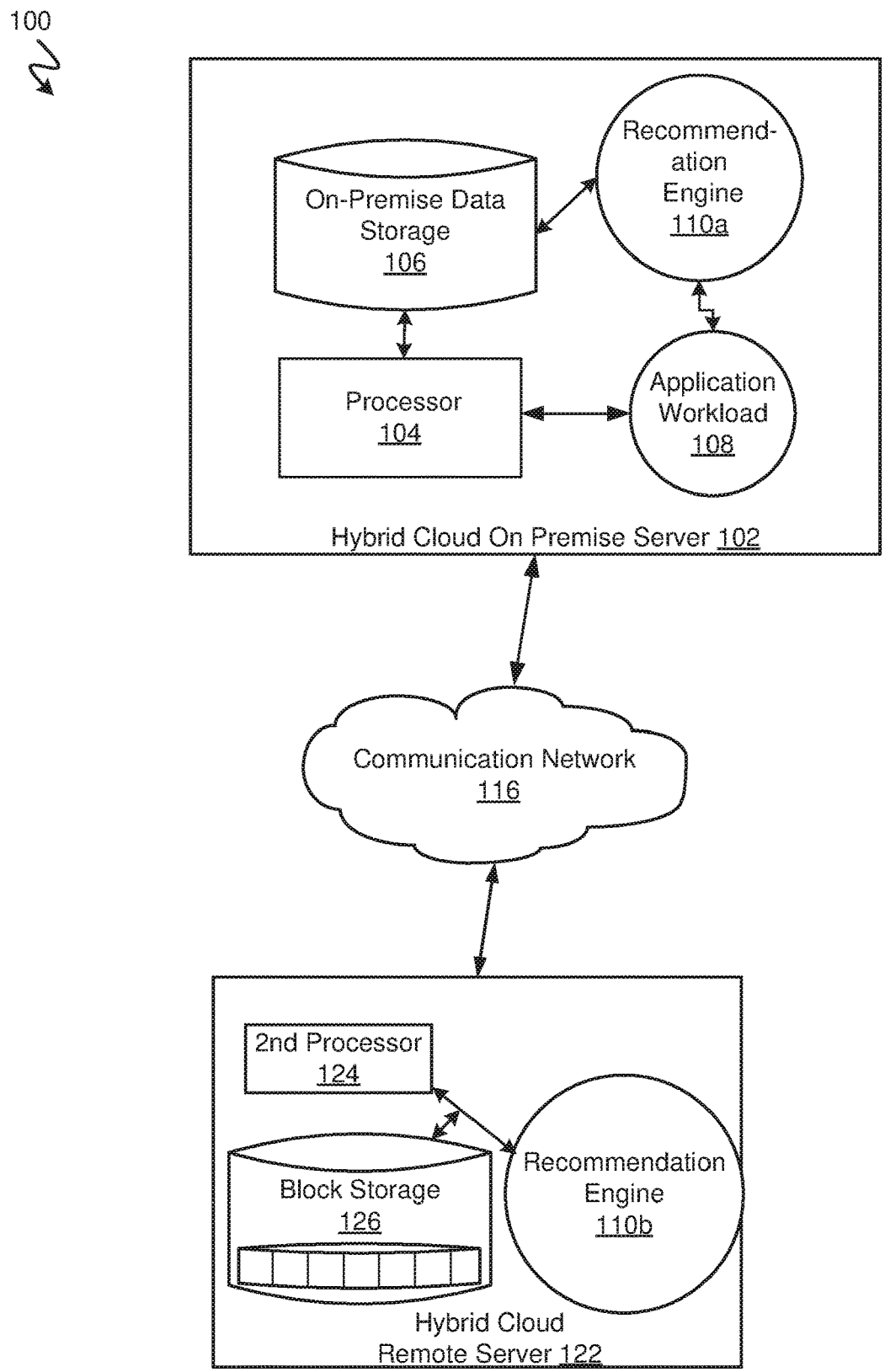
FIG. 1 illustrates a data block prediction and retrieval system according to at least one embodiment.

Referring to FIG. 1, a data block prediction and retrieval system 100 in accordance with an exemplary embodiment is depicted. The data block prediction and retrieval system 100 in the depicted embodiment may include a hybrid cloud on-premise server 102 and a hybrid cloud remote server 122. The on-premise server 102 may refer to this server being on-premise of a client organization who may use and work with the hybrid cloud remote server 122 for data storage as a service. These two servers 102, 122 may communicate with each other and exchange data via the communication network 116. Other data block prediction and retrieval systems may be used in other embodiments which include multiple on-premise servers, multiple cloud servers, and one or more other processing computers which may connect to and communicate with the servers. The communication network 116 allowing communication between the servers 102, 122 may include various types of communication networks, such as the Internet, a wide area network (WAN), a local area network (LAN), a telecommunication network, a wireless network, a public switched telephone network (PTSN) and/or a satellite network. The communication network 116 may include connections such as wire, wireless communication links, and/or fiber optic cables.

The hybrid cloud on-premise server 102 may include among other components a processor 104, on-premise data storage 106, an application workload 108, and a recommendation engine 110a. The hybrid cloud remote server 122 may include among other components a second processor 124, block storage 126, and a recommendation engine 110b. Updates to the recommendation engine 110b at the hybrid cloud remote server 122 may be transmitted to the recommendation engine 110a at the hybrid cloud on-premise server 102 so that the recommendation engine 110a remains current and incorporates new training and data.

The two servers 102, 122 and especially the remote server 122 may perform object-based storage, also known as object storage, which stores unstructured data that may be growing exponentially. In object storage, data may be bundled with metadata tags and with a unique identifier to create an object. The metadata is customizable. The objects may be stored in a flat address space. Cloud vendors have provided object storage as a service. A wide variety of data such as videos for streaming, images, documents, etc. may be stored as data objects in data storage in the cloud, e.g., in the block storage 126 of the hybrid cloud remote server 122.

Hybrid cloud storage systems may include cloud object storage and the transfer of data between that storage on the cloud and an on-premise data storage system. Data is transferred from the hybrid cloud on-premise server 102 to the hybrid cloud remote server 122 for storage in the hybrid cloud remote server 122. Data may be read and/or retrieved from the hybrid cloud remote server 122 to bring the data to the on-premise server 102 and to the one or more on-premise computers associated with the on-premise server 102. The data transfers may incorporate transparent cloud tiering concepts which include copying and transfer of volume data into the cloud storage, e.g., into the remote server 122. Server-less movement of archive and backup data may also occur directly to a cloud object storage. The cloud tier may be used for active data archival so that data can be retrieved real time on demand. Workloads such as the application workload 108 may run on the on-premise server 102 and may cause retrieval of data on demand from the cloud storage system and specifically from the remote server 122 based on workload business processing needs, e.g., based on needs of the application workload 108 that is being performed.

Cloud object storage supports reads that retrieve a complete object from the cloud. Retrieving an entire object may be inefficient especially when only a portion of the entire object is needed and/or requested by the workload. If a 1 GB file is migrated to the cloud and stored in block storage 126 with a block size of 4 MB, with the 4 MB block size, the 1 GB file represents 256 disk blocks in the block storage 126. For retrieval of entire objects, all 1 GB may be retrieved from the cloud storage to on-premise storage despite only some or a few of the particular blocks being needed. This downloading of the entire block harms network bandwidth, disk space, and workload response times.

Cloud object storage may also allow reads that retrieve bytes of an object using an HTTP range header. Cloud providers support range-read operation based on HTTP range header attributes in a data request. The attributes indicate that a particular block or byte-offset is to be read. In these range reads, the specified range bytes or byte offsets of an object in the block storage 126 in the remote server 122 are read/retrieved for transmitting to the on-premise server 102. Thus, a sub-set of an entire data object may be retrieved/downloaded based on a specific byte range that is provided. This sub-set retrieval may be performed instead of retrieving the entire data object but may nevertheless experience performance challenges if incorrect blocks are frequently retrieved/downloaded. This retrieving of incorrect blocks wastes time and downloading resources.

The recommendation engine 110a, 110b may incorporate a recommendation system as a sub-class of information filtering systems that seeks to predict the rating or preference that a user/request would give to an item/object. A recommendation engine filters data using different algorithms and recommends what the algorithm deems to be the most relevant items/objects to the particular user/request. A recommendation engine may first capture past behavior of a customer/request and then, based on the past behavior, provide suggestions such as products and/or other objects that the user/request might be likely to access. Recommender systems may make use of collaborative filtering, content-based filtering, personality-based filtering, and/or knowledge-based filtering.

The recommendation engine 110a, 110b of the present embodiments may utilize past block storage accessing to predict which blocks may be accessed and retrieved in a workload session or sequence. The recommendation engine 110a, 110b may include one or more machine learning models which have been trained using data from previous data accessing sessions and sequences, and particularly using the sequence of which data blocks were accessed in a particular workload session/sequence. The recommendation engine 110a, 110b may also include a cosine similarity calculator to perform and compare cosine similarity between a current data block request sequence and prior data block request sequences. The recommendation engine 110a, 110b may also include a score comparator to compare cosine similarity scores that are calculated. The recommendation engine 110a, 110b may also include a K-NN regression algorithm to identify similar past data block request sequences to a current data block request sequence. The recommendation engines 110a, 110b may receive a partial current data block request sequence as input and then, in response, as output provide one or more predictions of additional data blocks to be requested in the rest of the current data block request sequence. Based on the prediction, the recommendation engine 110a, 110b may determine if the predicted block is already at the on-premise data storage 106 of the on premise server 102 and if the predicted block is not already at the on-premise data storage 106 to prefetch that predicted block from the remote server 122 to the on-premise server 102. This prefetching allows the data from the predicted block to already be present at the on-premise server 102 which saves time in case the prediction is correct and the actual current data request sequence indeed includes accessing that particular data block as was predicted.

The data block prediction and retrieval system 100 may include other computers that are connected to the hybrid cloud on premise server 102 which are enabled to run software programs associated with the application workload 108. This connection may be via a local network or also via the communication network 116. The data block prediction and retrieval system 100 may also utilize data request activity patterns generated by other on-premise servers. Thus, the recommendation engine 110b disposed at the central remote server 122 may improve its machine learning model using data accessing patterns from various clients and various application workloads and not just from the on premise server 102. When updates to the recommendation engine 110b occur due to data access patterns accrued from other client servers, updates may be transmitted from the recommendation engine 110b to the recommendation engine 110a at the on premise server 102 so that the predictions at the on premise server 102 may be improved because of the additional data.

Figure 3:
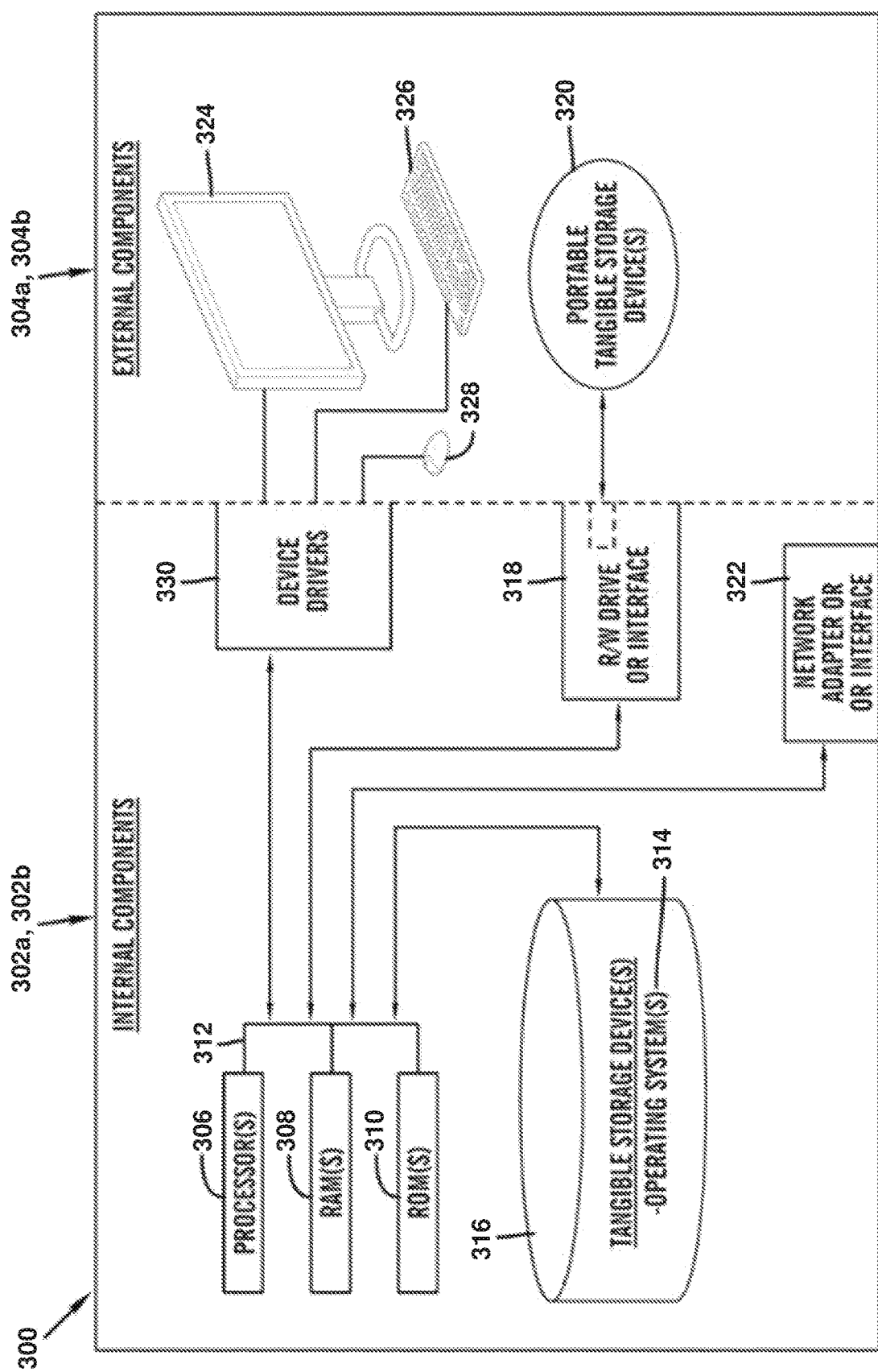
FIG. 3 is a block diagram of internal and external components of computers and servers depicted in FIG. 1 according to at least one embodiment.

As will be discussed with reference to FIG. 3, the servers 102, 122 may include internal components 302a and external components 304a, respectively. Other local computers which communicate with the on premise server 102 may each include internal components 302b and external components 304b as depicted in FIG. 3. Servers 102, 122 may also operate in a cloud computing service model, such as Software as a Service (SaaS), Platform as a Service (PaaS), or Infrastructure as a Service (IaaS). Servers 102, 122 may also be located in a cloud computing deployment model, such as a private cloud, community cloud, public cloud, or hybrid cloud. The other computers and the on premise server 102 may in some embodiments be, for example, a mobile device, a telephone, a personal digital assistant, a netbook, a laptop computer, a tablet computer, a desktop computer, or any type of computing devices capable of running a program such as the recommendation engine 110a, accessing a network, and accessing block storage 126 in the remote server 122 that is remotely located with respect to the local and/or on-premise computer. Such a local and/or on-premise computer may include a display screen, a speaker, a microphone, a camera, and a keyboard or other input device for receiving output and providing input to the respective computer.

It should be appreciated that FIG. 1 provides an illustration of one implementation and does not imply any limitations with regard to other embodiments in which the block prediction system and method may be implemented. Many modifications to the depicted environments, structures, and components may be made based on design and implementation requirements.

Figure 2:
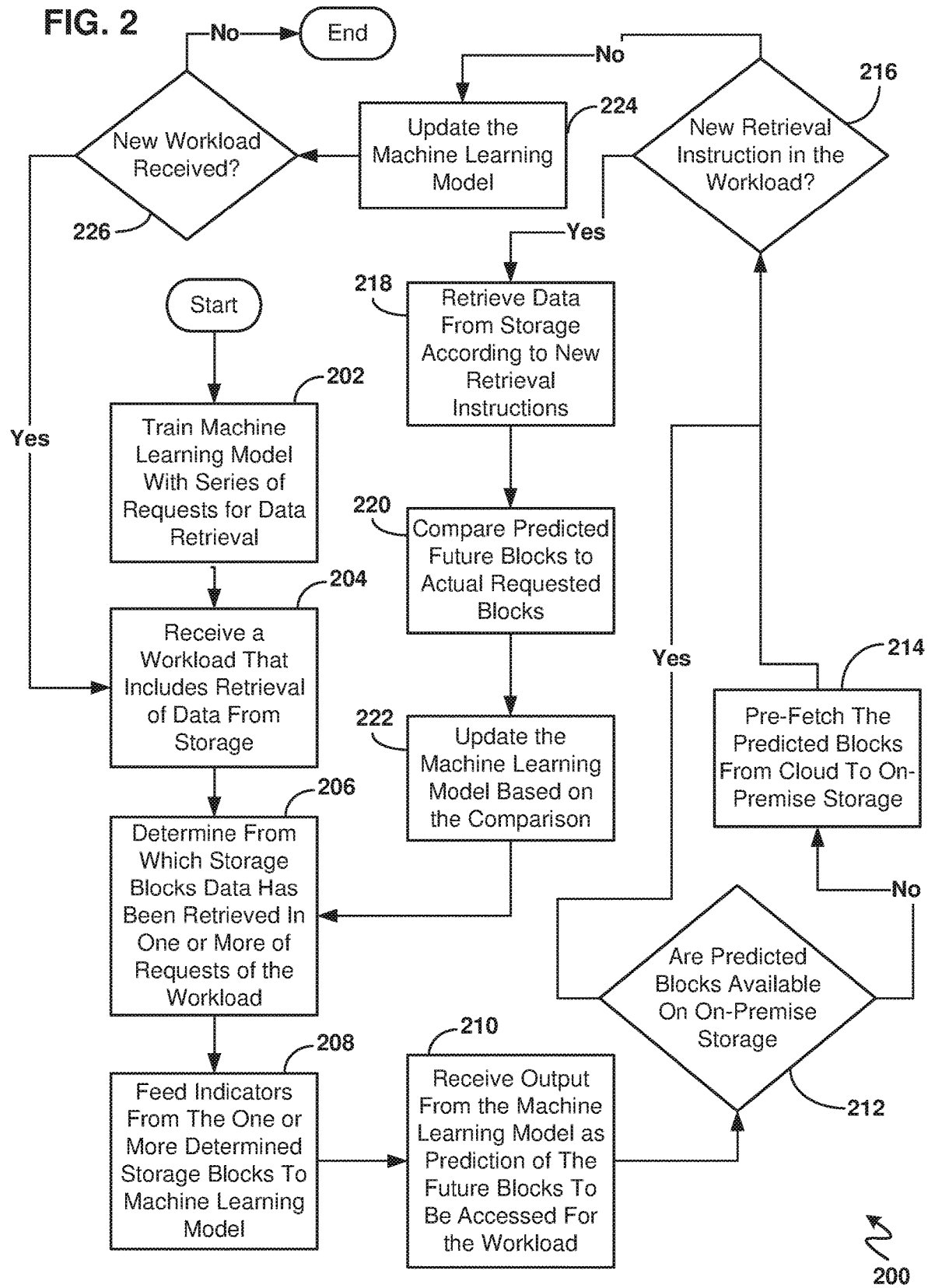
FIG. 2 is an operational flowchart illustrating a data block prediction and retrieval process according to at least one embodiment.

Referring now to FIG. 2, an operational flowchart depicts a data block prediction and retrieval process 200 that may, according to at least one embodiment, be performed using the recommendation engine 110a, 110b and the various components shown in the data block prediction and retrieval system 100 shown in FIG. 1. Various modules, user interfaces, and services, and data storage may be used to perform the data block prediction and retrieval process 200.

In a step 202 of the data block prediction and retrieval process 200, a machine learning model is trained with series of previous requests for data retrieval. This machine learning model may be part of the recommendation engine 110a, 110b shown in FIG. 1. Data block access patterns from historical data accessing may be captured in order to perform the model training of step 202. Various past read requests may be captured and the order of data blocks retrieved, and the particular data blocks accessed may be saved in some portion of the block storage 126 of the remote server 122. This data storage may be accessed via the recommendation engine 122b and may also be fed into a machine learning model of the recommendation engine 122b in order to train this machine learning model. A data request sequence may indicate which of all of the blocks of the data storage are accessed in a particular workload session and/or workload sequence. For example, the following chart 1 shows for certain data request sessions which individual data blocks were accessed in the workload session:

TABLE 1

| Request | Block1 | Block2 | Block3 | ... | BlockN-2 | BlockN-1 | BlockN |
|---------|--------|--------|--------|-----|----------|----------|--------|
| 1 | 1 | 0 | 0 |  | 1 | 0 | 1 |
| 2 | 1 | 1 | 1 |  | 0 | 0 | 0 |
| 3 | 0 | 1 | 0 |  | 1 | 1 | 0 |
| ... |  |  |  |  |  |  |  |
| N | 1 | 1 | 1 |  | 1 | 0 | 0 |

The far left Request column provides a respective indicator for a particular data request session. The top right row gives the names of the data blocks in a storage, e.g., in the block storage 126, and may in some instances include pointers to blocks/memory offsets. The 1 or 0 indicators in the other chart cells indicate in a binary manner whether a block was accessed, with a 1 indicating that the block was accessed and the 0 indicating that that respective block was not accessed in the particular data request. For example, in the data request sequence #1 the blocks 1, N-2, and N were accessed but the blocks 2, 3, and N-1 were not accessed. The historical data indicates that data blocks accessed in a particular request/sequence/workload session may be contiguous or randomly distributed across the total data blocks.

Some or all of the historical data may be obtained by the recommendation engine 110b in the remote server 122 tracking data requests in real time. This tracking may in some embodiments occur for requests received only from a particular on-premise server such as the on-premise server 102 or may be received only from a particular workload application such as the workload application 108. This tracking may in some embodiments occur for requests received from multiple workload applications, of which the workload application 108 is one, on a single on-premise server such as the on-premise server 102. This tracking may in some embodiments occur for requests received from multiple on-premise servers but only from a similar workload application-type on the various on-premise servers, e.g., only for workloads that include and are similar to the application workload 108. This tracking may in some embodiments occur for requests received from multiple on-premise servers including the on-premise server 102 but others as well.

The recommendation engine 110b at the remote server 122 may include a tracker that includes a data table such as is shown in Table 1. The recommendation engine 110a at the on-premise server 102 may include a tracker that includes a data table such as is shown in Table 1. For the tracker of the recommendation engine 110a of the on-premise server 102, this tracker will not have access to data request patterns from other servers.

In at least some embodiments, the recommendation engine 110a may have permission for and may choose to use the historical patterns of data access from other servers. The remote server 122 may be considered a central server for the data files stored in the block storage 126. Thus, the tracker of the recommendation engine 110b for this remote server 122 may track data access requests that come from a variety of on-premise servers of which the hybrid cloud on-premise server 102 is just one. In this embodiment, the recommendation engine 110b at the central server may send regular updates via the communication network 116 to the recommendation engine 110a at the on-premise server 102 so that the recommendation engine 110a at the on-premise server 102 may have the advantage of more data so that future data block access may be predicted with higher accuracy. Such updates may also be transferred via storage on a physical portable computer medium which is transported to the on-premise server 102 and uploaded to the on-premise server 102.

In some embodiments, the historical library of past request patterns may be gathered without training a machine learning model. The library may be saved in data storage and may be accessible to retrieve for calculations and comparisons.

In a step 204 of the data block prediction and retrieval process 200, a workload that includes retrieval of data from storage is received. This workload may be initiated by a user at the on-premise location who actuates the workload application 108 at the on-premise server 102. The workload may include a data request to access and retrieve data from one or both of the on-premise data storage 106 at the on-premise server 102 and the block storage 126 at the hybrid cloud remote server 122. The data request of the workload may include data read range requests in which one or more data blocks are requested. A range header attribute in the request may indicate with a byte offset or a block indicator which data block is to be requested and download. A new user or computer device accessing the application workload 108 may initiate the new workload. When an amount of time from a previous data request exceeds a pre-determined threshold, a tracker of the recommendation engine 110a may determine that a prior workload is finished. The next data request that is initiated via the on-premise server 102 may be interpreted by the recommendation engine 110a as a new workload.

In a step 206 of the data block prediction and retrieval process 200, the storage blocks from which data is retrieved in one or more of the initial requests of the workload are determined. The workload that is received in step 204 may begin to request data from various blocks in the block storage, e.g., from the on-premise data storage 106 at the on-premise server 102 and/or from the block storage 126 at the hybrid cloud remote server 122. A data tracker in the recommendation engine 110a may track which blocks have been requested to perform the determination of step 206. Following the data object storage example shown in Table 1, the workload may begin by retrieving data from one or more of the blocks 1, 2, N, etc. For a specific example A to be illustrated below in Table 2, the determination of step 206 is that Blocks 1 and 2 have been accessed as initial requests of a new workload that is labeled "6".

In a step 208 of the data block prediction and retrieval process 200, indicators from the one or more determined storage blocks are fed to the machine learning model. These determined storage blocks are those blocks that were determined in step 206 as having been accessed and/or retrieved in initial requests of the initiated workload. Thus, for the example A mentioned above the indicators of 1 and 2 representing Blocks 1 and 2 are fed into the machine learning model of the recommendation engine 110a of the on-premise server 102. In some embodiments, these indicators may be byte offsets which are a way of indicating a block, e.g., a block section.

In some embodiments, an alternative equivalent to step 208 may include performing a cosine similarity calculation on the first retrieval request compared to prior data retrievals without in a first instance using a machine learning model. The recommendation engine 110a may be programmed to carry out the below described cosine similarity calculation with retrieved information from a historical library and without initially needing a machine learning model or without inputting data into a machine learning model.

In a step 210 of the data block prediction and retrieval process 200, output from the machine learning model is received as a prediction of the future blocks to be accessed for the workload. This machine learning model which provides the output for step 210 is that machine learning model to which the variables were fed in step 208 and which may be part of the recommendation engine 110a. The feeding/inputting of step 208 may trigger the generation of this output that is received in step 210. The machine learning model may be used to generate a prediction of particular blocks which are expected to be accessed in this data workload sequence. Indicators for the predicted blocks may be received from the machine learning model and transmitted to the processor 104 in preparation for data block retrieval.

The machine learning model involved in steps 208 and 210 may be trained to perform a cosine similarity calculation with respect to the partial data request received in step 206 and the historical data requests that were used to train the machine learning model, e.g., that are shown in Table 1 or the block access information for the first five requests that are shown below in Table 2.

TABLE 2

| Request | Block1 | Block2 | Block3 | Block4 | Block5 | Block6 |
|---------|--------|--------|--------|--------|--------|--------|
| 1 | 1 | 0 | 1 | 1 | 0 | 1 |
| 2 | 0 | 0 | 0 | 0 | 0 | 0 |
| 3 | 1 | 1 | 1 | 1 | 0 | 0 |
| 4 | 1 | 0 | 1 | 0 | 1 | 0 |
| 5 | 1 | 0 | 1 | 1 | 1 | 0 |
| 6 | 1 | 1 | — | — | — | — |

The requests 1 to 5 in the first five request rows represent historical data, while the request 6 in the sixth (last) row indicates information about a current workload sessions/sequence for requesting data, namely the workload received in step 204. The present embodiments include predicting which of the remaining blocks 3 to 6 will be accessed in the current workload so that the blocks that are predicted to be accessed may be prefetched from data storage so that the data may be accessed more quickly. In at least some embodiments this prediction may include user-user collaborative filtering in that similarity scores between the current request and the historical request sequences are determined and the predictions are based on which historical request sequences have similarity scores that are most similar to the similarity score of the current workload request. In at least some embodiments, the similarity score may be determined using a cosine similarity calculation. The cosine similarity calculation treats each historical request sequence as a vector and may apply the formula:

$$\mathrm{Cos}(x,y) = x \cdot y / \|x\| * \|y\|$$

for finding a vector similarity score, namely a cosine similarity score between the two vectors x and y, where x represents a vector of one of the historical request sequences and y represents a vector of the current workload partial request sequence. "x·y" from the above formula represents a dot product of the vectors x and y. $\|x\|$ represents a length of the vector x. $\|y\|$ represents a length of the vector y. $\|x\|*\|y\|$ represents the cross product of the two vectors x and y.

For this cosine similarity calculation example the historical request sequence 1 from the above Table 2 will be compared to the current workload request 6 from the above Table 2. For the current workload request 6 the blocks which have not yet been visited or requested will be considered as not accessed and will be assigned a zero value ("0"). Thus, the x vector (representing request 1) for the above calculation is x={1, 0, 1, 1, 0, 1} and the y vector (representing current request, request 6) is y={1, 1, 0, 0, 0, 0}.

The following calculations may be carried out for the cosine similarity calculation of this example:

$$x \cdot y = 1*1 + 0*1 + 1*0 + 1*0 + 0*0 + 1*0 = 1$$

$$\|x\| = \sqrt{(1)^2 + (0)^2 + (1)^2 + (1)^2 + (0)^2 + (1)^2} = 2$$

$$\|y\| = \sqrt{(1)^2 + (1)^2 + (0)^2 + (0)^2 + (0)^2 + (0)^2} = \sqrt{2}$$

$$\therefore \mathrm{Cos}(x,y) = 1/(2*\sqrt{2}) = 0.35$$

Hence, the cosine similarity between request 1 and request 6 is 0.35, i.e., Cos (1,6)=0.35.

Following a similar model, the cosine similarities may be calculated between current workload request 6 and the other historical request sequences 2, 3, 4, and 5 as follows:

Cos(2,6)=0

Cos(3,6)=0.70

Cos(4,6)=0.4

Cos(5,6)=0.35

This example is intended to be simple for explanatory purposes, with six data blocks being possible to access. In other examples, fewer, more, or many more data blocks may be possible to access and will be incorporated into the cosine similarity calculation using the formula indicated above. For example, if 1 GB file is separated into 256 disk blocks in the block storage 126, then the above formulas may be run with 256 values for the vectors instead of merely six values for the vectors.

The machine learning model may be trained with various score comparison algorithms to determine a best matching historical request sequence or a group of best matching historical request sequences as samples for predicting the remaining blocks to be accessed for the current partial request.

In some embodiments without the initial use of the machine learning model, the recommendation engine 110b may include a data comparator which may make a scalar comparison of the calculated values. In the above example, with this scalar comparison the data comparator may determine that Cos (3, 6) is the closest match to Cos (6, 1) by having the highest cosine similarity score, may thus select historical request #3 as a matching data retrieval of the prior data retrievals 1 to 5, and may base the future block predictions for current request #6 on the historical request #3. The data comparator may recognize that the historical data retrieval #3 had the closest match to the current retrieval request #6 based on the cosine similarity comparison and may select the historical data retrieval #3 on that basis. In other words, using the Table 2 the recommendation engine 110a may identify other accessed blocks from the historical data retrieval #3 to predict the blocks that are to be accessed in the current retrieval request #6. Therefore, the recommendation engine 110a may identify the accessed blocks 3 and 4 from the historical data retrieval #3. The recommendation engine 110a may on that basis predict that the blocks 3 and 4 but not blocks 5 and 6 will be accessed in the current data workload request #6. Thus, the recommendation engine 110a would in the subsequent steps determine the location of the blocks 3 and 4 and prefetch those blocks to the on-premise server 102 if the blocks 3 and 4 are not already stored in the on-premise data storage 106 of the on-premise server 102. The recommendation engine 110a may transmit a prefetch request message over the communication network 116 to the remote server 122 if the blocks are not already at the on-premise server 102.

In some embodiments, the machine learning model may perform k-nn (nearest neighbor) regression on the results of the cosine similarity analysis to identify the closest historical request or the closest group of historical requests and, thereby, to make a prediction of which block would be accessed (those from the closest historical request or closest group). The "k" value that is chosen may be determined by the machine learning model on a trial and error basis, starting by analyzing model fit on randomly chosen "k" values. A "k" value may be chosen based on finding a minimum value of a validation error curve. The validation error curve may be generated from a training error set for different values of "k". Cross validation with an independent dataset or with using some reserved historical request data may alternatively or additionally be performed to determine the best "k" value. For testing various "k" values, the training data (historical data retrievals) may be broken into "k" number of sets to perform k-fold cross validation.

In the above example if the "k" value is chosen as 1, then the closest nearest neighbor, namely the historical request 3 is chosen as the basis for the block access predictions. In the above example if the "k" value is chosen as 2, then the two closest nearest neighbors, namely the historical requests 3 and 4, may be averaged and the average may be taken as the basis for the block access predictions. In an embodiment with k value of 2, block 5 may be prefetched along with blocks 3 and 4 (if these blocks are not already at the on-premise server 102).

Any machine learning model used for various steps of the data block prediction and retrieval process 200 may include naive Bayes models, random decision tree models, linear statistical query models, logistic regression n models, neural network models, e.g. convolutional neural networks, multi-layer perceptrons, residual networks, long short-term memory architectures, algorithms, deep learning models, and other models. The one or more machine learning models may be trained. The process of training a machine learning model may include providing training data to a learning algorithm or to a machine learning algorithm. The machine learning model is the model structure or system that is created by the training process. The training data should include targets or target attributes which include a correct answer, namely with the prior retrieval requests themselves indicating a series of blocks which were requested in a single workload request sequence/session. Training data for the present embodiments may include similar information for other workloads that were generated in the same or different on-premise servers. The learning algorithm finds patterns in the training data (historical request data access patterns) in order to map the input data attributes to the target. The machine learning model contains these patterns so that the answer can be predicted for similar future inputs. A machine learning model may be used to obtain predictions on new data for which the target is unknown. The machine learning model uses the patterns that are identified to determine what the target is for new data without a given answer. Training may include supervised and/or unsupervised learning.

Various commercial platforms exist to allow a machine learning model to be created or trained. The training may include selecting data types, uploading data, selecting class types, and allowing a commercial system to then train the data. Such data upload may occur at the recommendation engine 110a at the on-premise server 102 and/or at the recommendation engine 110b at the remote server 122.

In some embodiments, an alternative equivalent to steps 208 and 210 may include performing a cosine similarity calculation on the first retrieval request compared to prior data retrievals without in a first instance using a machine learning model. The recommendation engine 110a may be programmed to carry out the above described cosine similarity calculation with retrieved information from a historical library and without initially needing or inputting data to a machine learning model. In this embodiment, instead of receiving output from the machine learning model at this stage the recommendation engine 110a calculates cosine similarity values.

With this embodiment, the recommendation engine 110a may predict the future blocks to be accessed for the present retrieval sequence by invoking a data comparator to compare the calculated cosine similarity scores and identify one or more of the previous data retrievals that is a closest, e.g., highest, match to the current data retrieval request.

For these embodiments with cosine similarity performed as a calculation outside of the scope of a machine learning model, the results of the calculations may then be fed to a machine learning model to perform K-NN regression. Aspects of K-NN regression were discussed above.

Alternatively, instead of inputting the cosine similarity calculations the data request set as a set of categorical, i.e., discrete variables, (specific block accessed or not accessed) may be fed to a machine learning model trained to perform K-NN regression. This K-NN regression may implement Hamming distance calculation to determine similarity of prior data retrievals and the current retrieval request. Like as for the cosine similarity calculation, blocks not requested or not yet requested by the first retrieval request may be assigned a zero value (not accessed) for the Hamming distance calculation. The Hamming distance calculation may return a raw scalar number representing the number of matches (certain block accessed by both current request and previous request or not accessed by both the current request and the previous request). In the above set of 1 to 6 data retrieval sets, with #6 representing the current unfinished data retrieval request, the Hamming distance calculations may be:

(6:1)=1

(6:2)=4

(6:3)=4

(6:4)=3

(6:5)=3

Thus, the second and third historical requests may be considered most similar to the current (sixth) data retrieval request using the Hamming distance calculations.

With this embodiment, independently calculated matches (one from cosine similarity calculation and one from KNN regression) for the current data retrieval request compared to prior requests may be used to improve the accuracy of the predictions. When the two calculations produce different results, the results may be averaged or each predicted block may be prefetched. Prefetching is described below with respect to step 214.

In a step 212 of the data block prediction and retrieval process 200, a determination is made as to whether the predicted blocks are available on on-premise storage. The predicted blocks refers to those blocks that were predicted in the prediction received in step 210. The recommendation engine 110a may check the on-premise data storage 106, e.g., specifically a metadata table of the on-premise data storage 106. The metadata table may represent a comprehensive list of the stored data that is currently in the on-premise data storage 106. If the determination of step 212 is affirmative and the predicted blocks are available on the on-premise storage, then the data block prediction and retrieval process 200 proceeds from step 212 to step 216 and skips step 214. If the determination of step 212 is negative and the predicted blocks are not available on the on-premise storage, then the data block prediction and retrieval process 200 proceeds from step 212 to step 214.

In a step 214 of the data block prediction and retrieval process 200, the predicted blocks are prefetched from the cloud to on-premise storage. These predicted blocks are those blocks that were predicted in the prediction step 210. Following the example above set forth in Table 2, if the recommendation engine 110a determines that blocks 3 and 4 (and perhaps 5 if a particular k value were used for k-nn regression) are not on the on-premise data storage 106, then the recommendation engine 110a generates and transmits a download request, also known as a prefetch request, that is sent across the communication network 116 to the remote server 122. This download/prefetch request initiates a download of the data blocks 3 and 4 (and perhaps 5) over the communication network 116 to the on-premise server 102 and particularly to the on-premise data storage 106 in the on-premise server 102. With this prefetching, if in the current workload an additional request to blocks 3 and 4 (and perhaps to block 5) is indeed initiated then these data blocks may already be present at the on-premise server 102. This predicting and prefetching of the present embodiments may thus help the workload to execute more speedily, as the workload does not have to wait for an on demand download across the communication network 116 from the remote server 122 to the on-premise server 102. When prefetching occurs, the prefetching will occur for at least one block and may also occur for multiple blocks.

In a step 216 of the data block prediction and retrieval process 200, a determination is made as to whether there is a new retrieval instruction in the workload. A user or program participating in the workload, e.g., the application workload 108, may input requests for additional data which are stored in other data blocks within the data object storage. The recommendation engine 110a may recognize and sense such additional data block requests. For an affirmative determination in step 216 that a new retrieval instruction is in the workload, the data block prediction and retrieval process 200 proceeds to step 218. For a negative determination in step 216 that no new retrieval instruction is in the workload, the data block prediction and retrieval process 200 proceeds to step 224.

In a step 218 of the data block prediction and retrieval process 200, data is retrieved from storage according to the new retrieval instructions whose presence was verified in step 216. These retrieval instructions are part of the workload that was received in step 204. The request may include a data address such as a data block indicator or a byte offset which indicates where the requested data is located. The workload may submit a request for data and a data organization table in the on-premise server 102 may be accessed to determine the block address or specific block which holds the desired/requested data. Cloud range-read APIs may be used to retrieve the predicted blocks.

In a step 220 of the data block prediction and retrieval process 200, the predicted future blocks that were predicted in step 210 are compared to the actual requested blocks that were requested in step 216 and retrieved in step 218. Thus, if in the subsequent actual historical request session 6 the user requested data from blocks 3 and 4, then the recommendation engine 110a will compare those requested blocks with the predicted data blocks 3 and 4 (which may have been prefetched in some embodiments). If in the subsequent actual historical request session 6 the user requested data from only one of blocks 3 and 4 or from neither block 3 nor block 4, then the recommendation engine 110a will recognize the incorrect prediction.

In a step 222 of the data block prediction and retrieval process 200, the machine learning model is updated based on the comparison of step 220. The machine learning model that is updated in step 222 is the machine learning model that was trained in step 202, that was fed with the indicators in step 208, and whose output was received in step 210. The further training/updating of step 222 may include confirmation of correct predictions or may decrease a confidence level in the predictions if the predictions were inaccurate.

After step 222, the block prediction and pre-fetch process 200 proceeds to step 206 for a repeat of steps 206, 208, 210, 212, and possibly step 214 using the new retrieval data based on the blocks whose data was newly retrieved in step 218. Then after the repeat of steps 212 and possibly step 214 a repeat determination in step 216 is performed. Thus, an iterative loop may occur with some of the steps of the block prediction and pre-fetch process 200 that continues until a workload is exhausted and/or finished and includes no more data retrieval requests.

Step 224 of the data block prediction and retrieval process 200 occurs after a negative determination in step 216 when no new retrieval instruction is in the workload. In step 224, the machine learning model is updated. If the machine learning model had in step 210 predicted that other blocks would be accessed in this session, then the machine learning model may tag that prediction as inaccurate in this instance (because no other retrieval occurred in this particular workload as was determined in step 216). Thus, the machine learning model may change its prediction for future similar input or may reduce its confidence in that prediction for future similar input.

In a step 226 of the data block prediction and retrieval process 200, a determination is made as to whether any new workload is received. The recommendation engine 110a may monitor and sense new activation of a workload through the application workload 108 at the on-premise server 102 to perform the determination of step 226.

For an affirmative determination in step 226 that a new workload is received, the data block prediction and retrieval process 200 returns to step 204 for a repeat of many of the steps of the data block prediction and retrieval process 200 with respect to the retrieval instructions in the new workload. For a negative determination in step 226 that no workload is received the data block prediction and retrieval process 200 may end. The data block prediction and retrieval process 200 could, however, restart at a later time if a new workload is received and work off an already-trained machine learning model.

In one embodiment, a user may in a medical-related workload access various medical records such as videos, reports, images, etc. that are distributed across various blocks in data storage. The user may request the various data pieces intermittently, with his or her study of one data piece effecting the decision of which next data piece to request. The present embodiments may help in such a situation for the data pieces to be accessible more quickly because the as-of-yet unrequested data pieces may be predicted and prefetched to be present on the on-premise server 102.

It may be appreciated that FIG. 2 provides an illustration of some embodiments and does not imply any limitations with regard to how different embodiments may be implemented. Many modifications to the depicted embodiment(s), e.g., to a depicted sequence of steps, may be made based on design and implementation requirements. Steps and features from the various processes may be combined into the other processes that are described in other drawings or embodiments.

FIG. 3 is a block diagram 300 of internal and external components of computers depicted in FIG. 1 or otherwise used in the above-described process in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 302a, 302b, 304a, 304b is representative of any electronic device capable of executing machine-readable program instructions. Data processing system 302a, 302b, 304a, 304b may be representative of a smart phone, a computer system, PDA, or other electronic devices. Examples of computing systems, environments, and/or configurations that may represented by data processing system 302a, 302b, 304a, 304b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Any of the servers 102, 122 or other computer used in the data block prediction and retrieval system 100 may include respective sets of internal components 302a, 302b and/or external components 304a, 304b illustrated in FIG. 3. Each of the sets of internal components 302a, 302b includes one or more processors 306, one or more computer-readable RAMs 308 and one or more computer-readable ROMs 310 on one or more buses 312, and one or more operating systems 314 and one or more computer-readable tangible storage devices 316. The one or more operating systems 314, the application workload 108 in the on-premise server 102, and other programs stored on other computers for the system 100 may be stored on one or more computer-readable tangible storage devices 316 for execution by one or more processors 306 via one or more RAMs 308 (which typically include cache memory). In the embodiment illustrated in FIG. 3, each of the computer-readable tangible storage devices 316 is a magnetic disk storage device of an internal hard drive. Alternatively, each of the computer-readable tangible storage devices 316 is a semiconductor storage device such as ROM 310, EPROM, flash memory, or any other computer-readable tangible storage device that can store a computer program and digital information.

Each set of internal components 302a, 302b also includes a R/W drive or interface 318 to read from and write to one or more portable computer-readable tangible storage devices 320 such as a CD-ROM, DVD, memory stick, magnetic tape, magnetic disk, optical disk or semiconductor storage device. A software program, such as the application workload 108, can be stored on one or more of the respective portable computer-readable tangible storage devices 320, read via the respective R/W drive or interface 318 and loaded into the respective hard drive, e.g., the tangible storage device 316.

Each set of internal components 302a, 302b may also include network adapters (or switch port cards) or interfaces 322 such as a TCP/IP adapter cards, wireless wi-fi interface cards, or 3G, 4G, or 5G wireless interface cards or other wired or wireless communication links. The application workload 108 in the on-premise server 102 and updates to the recommendation engine 110a can be downloaded from an external computer (e.g., server) via a network (for example, the Internet, a local area network or other, wide area network) and respective network adapters or interfaces 322. From the network adapters (or switch port adaptors) or interfaces 322, the application workload 108 and the updates for the recommendation engine 110a are loaded into the respective hard drive, e.g., the tangible storage device 316. The network may include copper wires, optical fibers, wireless transmission, routers, firewalls, switches, gateway computers and/or edge servers.

Each of the sets of external components 304a, 304b can include a computer display monitor 324, a keyboard 326, and a computer mouse 328. External components 304a, 304b can also include touch screens, virtual keyboards, touch pads, pointing devices, and other human interface devices. Each of the sets of internal components 302a, 302b also includes device drivers 330 to interface to computer display monitor 324, keyboard 326, and computer mouse 328. The device drivers 330, R/W drive or interface 318 and network adapter or interface 322 include hardware and software (stored in storage device 316 and/or ROM 310).

In some embodiments, the data access prediction and retrieval process 200 may be performed in other data download settings in the cloud besides for hybrid cloud storage. The data access patterns may be monitored on individual computers, e.g., computing nodes, and the prefetching may occur to data storage within the respective individual computer, e.g., node.

The present invention may be a system, a method, and/or a computer program product at any possible technical detail level of integration. The computer program product may include a computer readable storage medium (or media) having computer readable program instructions thereon for causing a processor to carry out aspects of the present invention The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
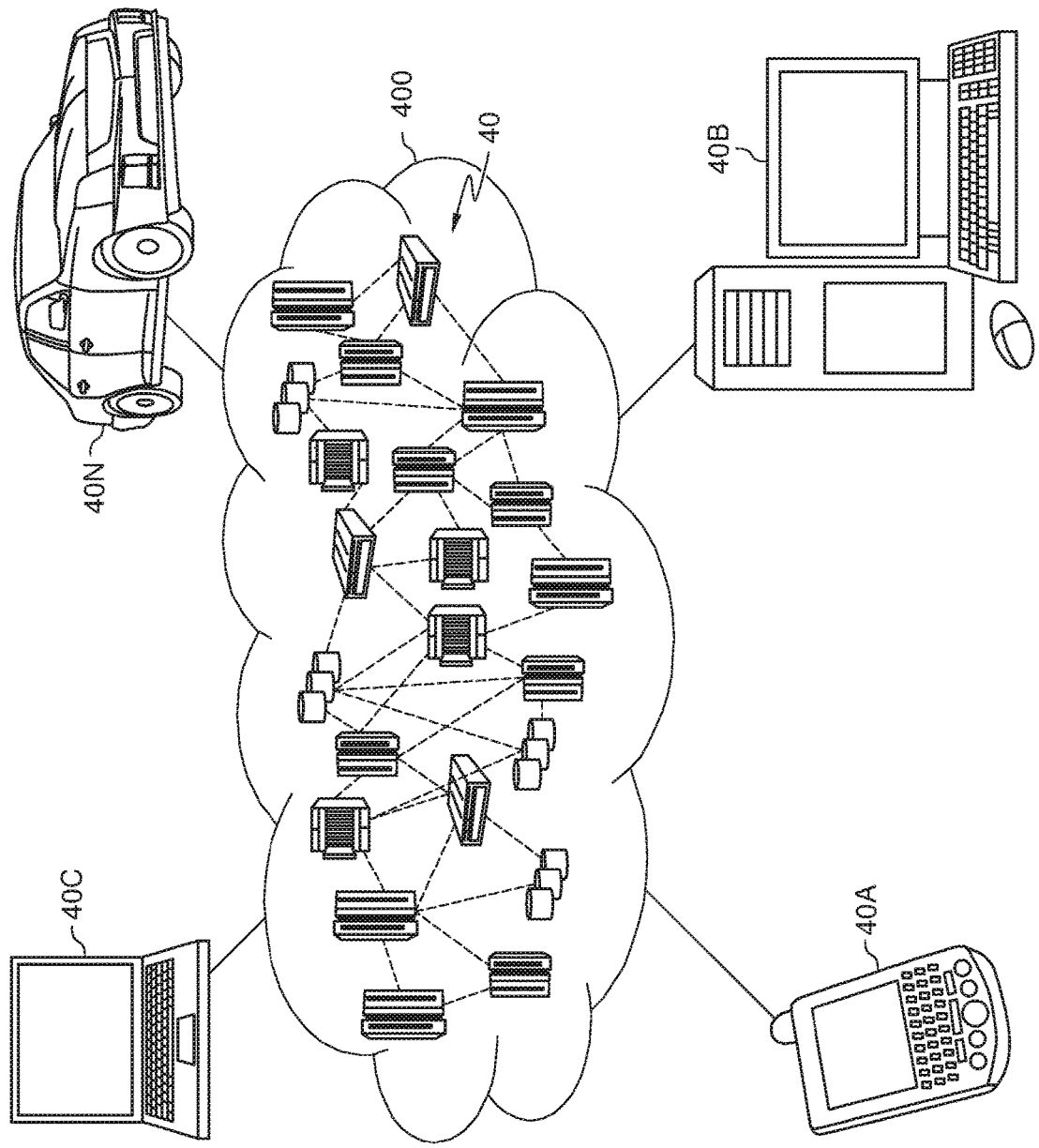
FIG. 4 is a block diagram of an illustrative cloud computing environment including the computers depicted in FIGS. 1 and 3 in accordance with an embodiment of the present disclosure.

Referring now to FIG. 4, illustrative cloud computing environment 400 is depicted. As shown, cloud computing environment 400 comprises one or more cloud computing nodes 40 with which local computing devices used by cloud consumers, such as, for example, personal digital assistant (PDA) or cellular telephone 40A, desktop computer 40B, laptop computer 40C, and/or automobile computer system 40N may communicate. Nodes 40 may communicate with one another and may include individual computers used to access data in the cloud. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 40A-N shown in FIG. 4 are intended to be illustrative only and that computing nodes 40 and cloud computing environment 400 can communicate with any type of computerized device over any type of network and/or network addressable connection (e.g., using a web browser).

Figure 5:
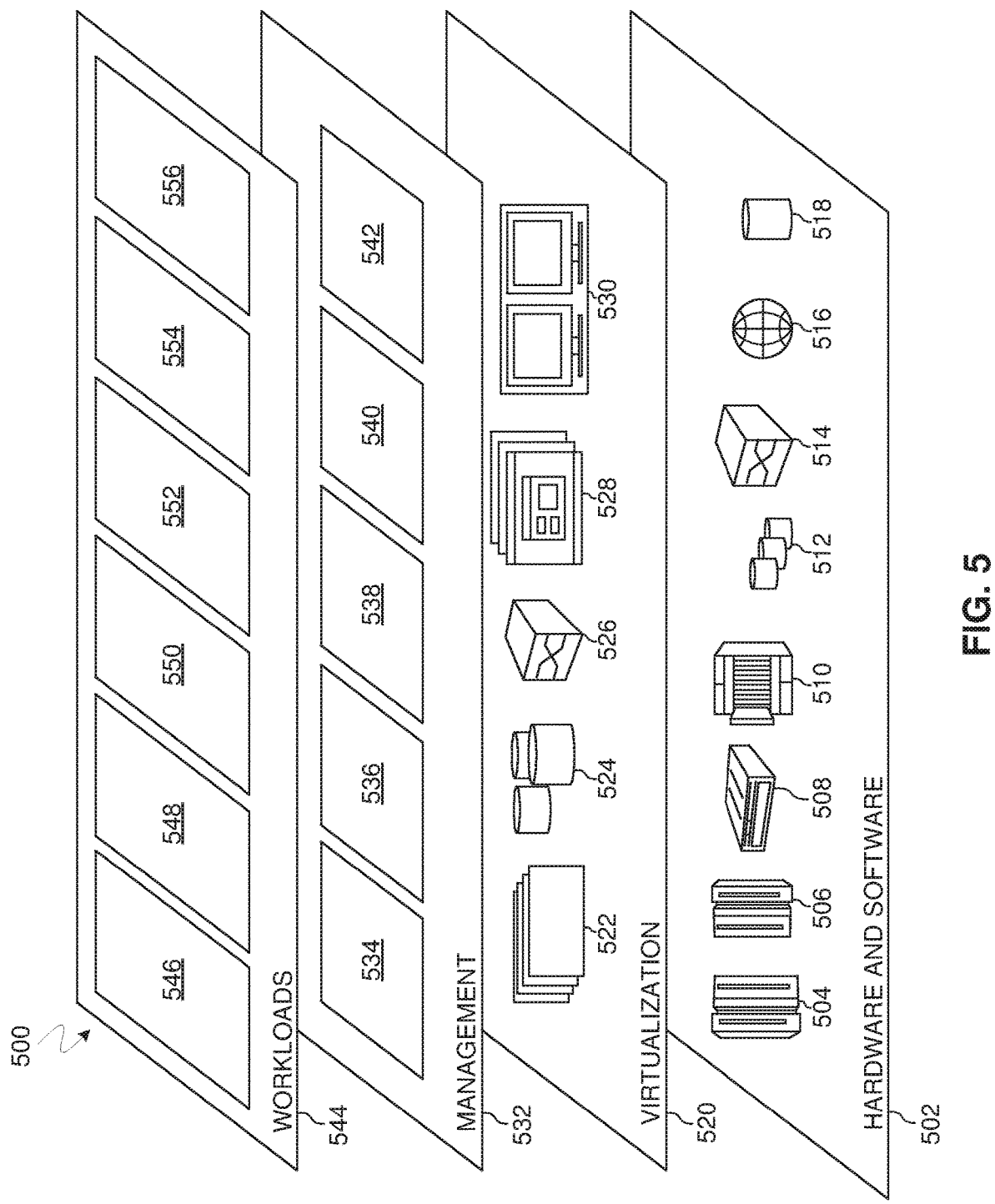
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 502 includes hardware and software components. Examples of hardware components include: mainframes 504; RISC (Reduced Instruction Set Computer) architecture based servers 506; servers 508; blade servers 510; storage devices 512; and networks and networking components 514. In some embodiments, software components include network application server software 516 and database software 518.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 532 may provide the functions described below. Resource provisioning 534 provides dynamic procurement of computing resources and other resources that are utilized to perform tasks within the cloud computing environment. Metering and Pricing 536 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 538 provides access to the cloud computing environment for consumers and system administrators. Service level management 540 provides cloud computing resource allocation and management such that required service levels are met. Service Level Agreement (SLA) planning and fulfillment 542 provide pre-arrangement for, and procurement of, cloud computing resources for which a future requirement is anticipated in accordance with an SLA.

Workloads layer 544 provides examples of functionality for which the cloud computing environment may be utilized. Examples of workloads and functions which may be provided from this layer include: mapping and navigation 546; software development and lifecycle management 548; virtual classroom education delivery 550; data analytics processing 552; transaction processing 554; and block access prediction 556. A block access prediction and retrieval program embodied in recommendation engine 110a, 110b provides a way to predict which data storage blocks will be accessed from the cloud and to prefetch those blocks in order to reduce data download time.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for block prediction, the method comprising:
receiving, via a computer, a first retrieval request for retrieving data from storage blocks;
performing, via the computer, a cosine similarity comparison of the first retrieval request compared to prior data retrievals;
selecting, via the computer, a matching data retrieval of the prior data retrievals, the matching data retrieval having a closest match to the first retrieval request based on the cosine similarity comparison;
identifying, via the computer, another storage block from the matching data retrieval as a predicted block for the first retrieval request; and
transmitting, via the computer, a prefetch request to prefetch data from the predicted block.

2. The method of claim 1, further comprising performing K-NN regression of the first retrieval request and the prior data retrievals to identify the predicted block.

3. The method of claim 1, wherein the closest match comprises a highest cosine similarity score for the matching data retrieval compared to the first retrieval request.

4. The method of claim 1, wherein the prefetching of the data from the predicted block comprises the computer sending a prefetch request across a network to a remote server.

5. The method of claim 1, wherein the prior data retrievals are based on requests from various computers to a first remote server.

6. The method of claim 1, wherein the prior data retrievals are based on requests from a first on-premise server to a first remote server.

7. The method of claim 1, wherein blocks not requested by the first retrieval request are assigned a zero value for the cosine similarity comparison.

8. A computer system for block prediction, the computer system comprising:
one or more processors, one or more computer-readable memories, and program instructions stored on at least one of the one or more computer-readable memories for execution by at least one of the one or more processors to cause the computer system to:
receive a first retrieval request for retrieving data from storage blocks;
performing a cosine similarity comparison of the first retrieval request compared to prior data retrievals;
select a matching data retrieval of the prior data retrievals, the matching data retrieval having a closest match to the first retrieval request based on the cosine similarity comparison;

identify another storage block from the matching data retrieval as a predicted block for the first retrieval request; and transmit a prefetch request to prefetch data from the predicted block.

9. The computer system of claim 8, wherein the program instructions are further for execution to cause the computer system to perform K-NN regression of the first retrieval request and the prior data retrievals to identify the predicted block.

10. The computer system of claim 8, wherein the closest match comprises a highest cosine similarity score for the matching data retrieval compared to the first retrieval request.

11. The computer system of claim 8, wherein the prefetching of the data from the predicted block comprises the computer sending a prefetch request across a network to a remote server.

12. The computer system of claim 8, wherein the prior data retrievals are based on requests from various computers to a first remote server.

13. The computer system of claim 8, wherein the prior data retrievals are based on requests from a first on-premise server to a first remote server.

14. The computer system of claim 8, wherein blocks not requested by the first retrieval request are assigned a zero value for the cosine similarity comparison.

15. A computer program product for block prediction, the computer program product comprising a computer-readable storage medium having program instructions embodied therewith, wherein the program instructions are executable by a computer system to cause the computer system to:

receive a first retrieval request for retrieving data from storage blocks;

performing a cosine similarity comparison of the first retrieval request compared to prior data retrievals;

select a matching data retrieval of the prior data retrievals, the matching data retrieval having a closest match to the first retrieval request based on the cosine similarity comparison;

identify another storage block from the matching data retrieval as a predicted block for the first retrieval request; and transmit a prefetch request to prefetch data from the predicted block.

16. The computer program product of claim 15, wherein the program instructions are further for execution to cause the computer system to perform K-NN regression of the first retrieval request and the prior data retrievals to identify the predicted block.

17. The computer program product of claim 15, wherein the closest match comprises a highest cosine similarity score for the matching data retrieval compared to the first retrieval request.

18. The computer program product of claim 15, wherein the prefetching of the data comprises the computer sending a prefetch request for the predicted block across a network to a remote server.

19. The computer program product of claim 15, wherein the prior data retrievals are based on requests from various computers to a first remote server.

20. The computer program product of claim 15, wherein blocks not requested by the first retrieval request are assigned a zero value for the cosine similarity comparison.

* * * * *